3,168,579
PRODUCTION OF POLYOLS FROM SUBSTITUTED ALDEHYDES

George A. Boswell, Jr., Hayward, Calif., and Rupert C. Morris, Manchester, England, assignors to Shell Oil Company, New York, N.Y., a corporation of Delaware
No Drawing. Filed Oct. 14, 1960, Ser. No. 62,529
6 Claims. (Cl. 260—635)

This invention relates to the reduction of substituted aldehydes of a special type which offers particular difficulty in conversion to the corresponding polyols and deals with an improved method whereby the reduction can be carried out efficiently and economically by catalytic hydrogenation.

Aldehydes which are free of substituents reactive with the aldehyde group have been successfully hydrogenated to polyols in the past. Hydrogenation of aldehydes substituted by groups reactive with the aldehyde group, for example, other aldehyde groups or hydroxyl groups, has also been carried out to produce good yields of polyols. However, with this special type of substituted aldehyde, the effective life of the catalysts used was so short that this method of producing polyols was economically impractical except in the production of high-priced compounds. It is an important object of this invention to provide a method for hydrogenating substituted aldehydes of this kind which avoids this disadvantage of the prior procedures. More particularly, it is an object of the invention to provide a method for the catalytic hydrogenation of hydroxyaldehydes and/or polyaldehydes to polyols in which not only high yields of desirable products but also long catalyst life can be achieved so costs can be reduced compared with prior methods.

It has been observed that under the conditions previously used in hydrogenating alpha-hydroxyaldehydes, for example, in aqueous solution in the presence of a solid catalyst, the reaction mixture develops acid and the catalyst is rapidly deactivated. Nickel catalysts, for instance, are dissolved by the acid solution which often becomes colored bright green from the dissolved nickel. At hydrogen pressures of 200 to 1000 p.s.i. and temperatures of 60° to 125° C. in the hydrogenation of alpha-hydroxyadipaldehyde, for example, the pH of the solution will fall to 3 or less where Raney nickel rapidly becomes virtually inactive toward the hydrogenation of carbonyl groups. As a result, the catalyst is rendered inactive by a single batch hydrogenation in which the conversion of the hydroxyaldehyde is still incomplete. Catalyst life is likewise shortened when hydrogenating polyaldehydes such as glutaraldehyde, for example.

Buffers can be used to prevent acid attack on the catalyst. Sodium bicarbonate, calcium carbonate, triethanolamine, and the like can be used and the effective life of the catalyst can be somewhat extended in this way. However, not only is the catalyst life still much shorter than is necessary for economical operation in most cases, but also the yield of polyol is undesirably reduced by this method of operation. This is due to the fact that substituted aldehydes of this kind are especially prone to undergo aldol condensation reactions under such conditions. The use of buffers to prevent acid development during their hydrogenation is therefore not a satisfactory solution to the problem of hydrogenating these aldehydes.

The discovery has now been made that the difficulties of prior methods can be avoided and the reduction of aldehydes substituted by groups reactive with the aldehyde group, e.g., one or more other aldehyde groups or hydroxyl groups, to polyols in high yields at low cost can be realized by converting the substituted aldehyde to a hemiacetal and catalytically hydrogenating the hemiacetal in aqueous solution in the presence of a solid hydrogenation catalyst.

Any soluble hemiacetal of the substituted aldehyde can be used successfully in the process of the invention, i.e., any such hemiacetal having a solubility in the hydrogenation mixture of at least 0.1 gram per 100 grams of liquid mixture at the hydrogenation temperature. Most preferably hemiacetals of lower, aliphatic, saturated alcohols, particularly unsubstituted alkanols, having from 1 to about 6 carbon atoms per molecule are used. These alcohols have the advantages of being readily recoverable from the polyol product in most cases and are for the most part readily available at a low cost. Instead of monohydric alcohols, one can use polyhydric alcohols. Alcohols which form a water-soluble hemiacetal of the substituted aldehyde which is to be reduced, are especially advantageous, but by carrying out the hydrogenation in the presence of a mutual solvent for water and the hemiacetal, one can successfully use water-insoluble hemiacetals in the process. The alcohol from which the hemiacetal is produced is usually an advantageous mutual solvent for this purpose. Reaction of the substituted aldehyde with an excess of the alcohol in the presence of water is thus one convenient method of producing the aqueous solutions of the hemiacetals for hydrogenation. Primary and especially secondary alcohols are more advantageous for making the hemiacetals but tertiary alcohols can be used.

Typical examples of alcohols which can be used in making hemiacetals of the substituted aldehydes for hydrogenation by the new process, are alkanols such as methanol, ethanol, normal and isopropanol, the butanols, pentanols and hexanols; cyclic alcohols such as cyclohexanol and 4-methylcyclohexanol; alkanediol of which ethylene glycol, propylene glycol, trimethylene glycol, butylene glycol, 2-methyl-propane-1,2-diol, 1,2-hexanediol, etc., are representative; other polyols, as, for instance, glycerol, hexanetriol, 1,2,4-hexanetriol, sorbitol and the like. Substitution products of these alcohols which are unreactive under the hydrogenation conditions can be used in the same way to make the hemiacetals. Suitable examples are hydroxy ethers of the foregoing or other polyols, e.g., the monomethyl ether of ethylene glycol, glycerol beta-ethyl ether, etc. Mixtures of two or more of these substituted or unsubstituted alcohols can be used instead of the individual compounds.

Aqueous solutions of the substituted aldehyde hemiacetals of alcohols of the foregoing types maintain a pH in the range of from about 6 to 7 under hydrogenation conditions and make it feasible to obtain long effective catalyst life at high yields of polyols.

A wide variety of solid hydrogenation catalysts are suitable for hydrogenation of the hemiacetals of substituted aldehydes in accordance with the invention. Active metal catalysts are especially suitable. Representative examples of such metals are nickel, iron, cobalt, copper, silver, gold, molybdenum, tungsten, vanadium, tin, ruthenium, rhodium, palladium, osmium, iridium and platinum. There are special advantages in using nickel catalysts promoted with other metals, particularly effective promoters being platinum, chromium, copper, cobalt and magnesium, for example. Catalytically active metal compounds, especially oxides, chromites, etc., of the foregoing metals can be used instead of the metals themselves. The catalysts can be used with or without carriers or supports such as kieselguhr, pumice, carbon and the like. Raney-type metal catalysts are especially useful. Amounts of catalyst in the range of about 0.1 to 20% of catalyst based on the weight of hemiacetal can be used.

The hydrogenation can be carried out by suspending the catalyst in the aqueous solution of the hemiacetal of the substituted aldehyde which is to be reduced or by passing the solution through a fixed bed of the catalyst or in other ways. Batch, intermittent or continuous methods of operation can be employed.

Hydrogen pressures of about 50 to about 500 p.s.i.g. are suitable. The temperature which will be most advantageous will depend upon the activity of the catalysts. With active noble metal catalysts such as palladium or platinum, temperatures of the order of about 20° to about 250° C. are suitable. With Raney nickel catalyst prepared by the method of U.S. Patent 1,628,190, for example, temperatures of about 50° to about 200° C. are preferable, while higher temperatures up to about 300° C. or above may be useful with less active catalysts.

It is desirable for best results in the new process of the invention that the hydrogenation be carried out with aqueous solutions which are essentially free from undissolved organic material. This requires considerable care because the substituted aldehydes used as starting materials for the process are especially prone to undergo linear and cyclic polymerization. The polymers form rapidly in pure hydroxyaldehydes and freshly distilled clear aqueous solutions of the hydroxyaldehydes can become noticeably "milky" after standing for only a short time. Considerable amounts of gummy, white polymer may deposit on longer standing. The deposition of such insoluble material on the hydrogenation catalyst reduces its activity and shortens its effective life. For this reason it is advantageous to convert the hydroxyaldehyde to the hemiacetal which is to be hydrogenated before the formation of any polymer or other organic material which is not soluble in the hydrogenation mixture. To this end it is preferred to produce the hemiacetal from freshly prepared hydroxyaldehyde which is free from insoluble material. Alternatively one can, by filtration, centrifugation or pretreatment with an active catalyst or the like, remove any insoluble components from the substituted-aldehyde feed prior to hydrogenation. This is a less desirable procedure, however, because of the added cost of the extra step.

On completion of the hydrogenation the solution can be separated from the catalyst and the polyol product recovered from the alcohol used in making the hemiacetal. Distillation is usually suitable for this separation but other methods can be employed. The catalyst can be re-used in the process repeatedly so that its cost in the process is very low. If after such re-use its activity becomes reduced excessively, the catalyst can be regenerated in the usual way and then employed for further hydrogenation.

The following examples illustrate some of the ways the invention can be carried out and show some of its advantages.

EXAMPLE I

Reduction of alpha-hydroxyadipaldehyde

An aqueous solution of alpha-hydroxyadipaldehyde freshly prepared by hydrolysis of acrolein dimer and adjustment of the pH to 6 with dilute aqueous sodium hydroxide was converted to the hemiacetal, chiefly the mono-hemiacetal by reaction with isopropanol before any formation of insoluble compounds took place. The isopropanol had been deaerated by boiling and was used in an amount equal to the weight of water employed in the hydrolysis which was such as to yield a solution of about 30% aldehyde concentration.

The hydrogenation was carried out in a 1-liter, horizontally stirred autoclave equipped with a steam coil for heating. Hydrogen was supplied from a reservoir of known volume through a constant pressure valve which maintained the pressure in the reaction at the desired value. The reactor was charged with Raney nickel catalyst along with sufficient isopropanol to keep the catalyst covered. The Raney nickel was commercially available catalyst ("No. 28") which had been pretreated by vigorous shaking with water for about 30 seconds, settling and then decanting the water, this procedure being repeated four times, after which the catalyst was washed four times with acetone using the identical procedure used with the water. The acetone was then removed from the catalyst by washing with isopropanol, yielding a very pyrophoric Raney nickel of greater initial activity toward hydrogenation and less susceptibility to deactivation than the same amount of Raney nickel which had been washed with water only. This method of activation is useful not only with Raney nickel but also related metal catalysts produced via treatment of a silicon or aluminum or like alloy thereof with a solvent for the silicon or aluminum which does not dissolve the nickel or other catalyst metal, aqueous sodium hydroxide, for example, being a suitable solvent of this type. Instead of acetone, one can use other organic solvents which are miscible with the solvent used in the hydrogenation such, for example, as, tetrahydrofuran, or other ethers, ethyl methyl ketone or other miscible ketones or hydroxyketones, propionaldehyde or similar aldehydes and the like. Other alcohols which are solvents for this chosen organic solvent, for instance, ethanol, isobutanol, and the like, can be used in the final step of the activation instead of isopropanol. This method of catalyst improvement, which can also be used in regenerating Raney-type catalysts which have lost some or all of their hydrogenation activity through use, is a feature of the invention which is advantageous whether or not used in conjunction with the new process of substituted aldehyde hemiacetal hydrogenation defined in the appended claims.

After introduction of 1.5 to 2 grams (charge weight) of catalyst, the reactor was flushed with nitrogen and then hydrogen was fed at 500 p.s.i. while the catalyst was stirred for about 30 minutes at 60° C. The reactor was then cooled to 18–20° C. and about 150 grams of alpha-hydroxyadipaldehyde hemiacetal was pumped in as a deaerated 15–20% wt. solution in equal parts of isopropanol and water. After addition of the aldehyde, the reactor was again flushed with nitrogen followed by hydrogen and brought up to a reaction temperature of 60–65° C. and 500–530 p.s.i. pressure while stirring. When hydrogen consumption ceased, the reaction charge was filtered under pressure from the reactor and a second charge of alpha-hydroxyadipaldehyde was then pumped in and the same procedure repeated.

The following are the reaction conditions and results obtained in three successive batches with the same catalyst charge.

| Alpha-hydroxyadipaldehyde isopropyl hemiacetal charged (moles) | Hydrogen Uptake | | Conversion of aldehyde hemiacetal (percent) | Apparent reaction rate constant ($\times 10^{-3}$ min.$^{-1}$) | Weight of aldehyde converted per unit weight of catalyst |
|---|---|---|---|---|---|
| | Theoretical (lbs.) | Observed (lbs.) | | | |
| 0.78 | 360 | 340 | 96 | 52 | 49–62 |
| 0.78 | 360 | 360 | 90 | 29 | 94–122 |
| 0.76 | 352 | 340 | 97 | 13 | 142–188 |

Product obtained in this way was rehydrogenated under the same conditions to remove the last small amount of unreacted starting material and then was Claisen distilled at 150–155° C. and 1 mm. mercury pressure. A 96% yield on a loss-free basis of 1,2,6-hexanetriol was obtained.

Good results have also been obtained when using 50% nickel on kieselguhr, reduced by heating with 800 p.s.i. hydrogen for one hour at 150–175° C., as the catalyst instead of Raney nickel in the foregoing process, although this supported catalyst was less active when compared on the basis of equal amounts of nickel. Supported noble metal catalyst such as platinum and ruthenium on carbon also give a long effective life in hydrogenating hydroxyaldehyde hemiacetals according to the invention.

EXAMPLE II

Reduction of alpha-hydroxyadipaldehyde methyl hemiacetal

The method of the foregoing example was repeated with the methyl hemiacetal of alpha-hydroxyadipaldehyde in place of the isopropyl hemiacetal. The hemiacetal was hydrogenated in solution in aqueous methanol. In the single batch hydrogenated, the hydrogen uptake was 400 pounds. The conversion of the hemiacetal to 1,2,6-hexanetriol was 65% at a reaction rate of $10 \times 10^{-3}$ min.$^{-1}$. The catalyst life was estimated to be the same as in Example I.

EXAMPLE III

Reduction of glyceraldehyde

Using the method of Example I glyceraldehyde was hydrogenated to glycerine at 60–70° C. and 500 to 520 p.s.i. hydrogen pressure. Three successive batch hydrogenations were carried out using the same charge of 1.5–2 grams, dry weight, of Raney nickel catalyst prepared by the method described in the previous example. In each case the glyceraldehyde was charged to the reactor as a solution of the isopropyl hemiacetal in a mixture of about equal parts of isopropanol and water having a pH of 7.0–7.1. The following results were obtained.

| Glyceraldehyde isopropyl hemiacetal charged (moles) | Conversion of glycerolaldehyde hemiacetal (percent) | Apparent reaction rate constant ($\times 10^{-3}$ min.$^{-1}$) | Weight of aldehyde converted per unit weight of catalyst |
|---|---|---|---|
| 1.04 | 96+ | 156 | |
| 1.04 | 96+ | 48 | |
| 0.87 | 70 | | 119–158 |

The catalyst was still active when the reaction was stopped.

EXAMPLE IV

Reduction of hexanetriol hemiacetal of alpha-hydroxyadipaldehyde

Using the method of Example I, the hemiacetal formed from alpha-hydroxyadipaldehyde and 1,2,6-hexanetriol was hydrogenated in solution in a 1:1.5 mixture of the hexanetriol and water having an initial pH of 6.5. The hydrogenation was carried out at 70–95° C. and 520–530 p.s.i. hydrogen pressure. The reactor was charged with 4 grams of Raney nickel, but due to dislodgment of the filter in the reactor during the reaction a large amount of the catalyst collected in the drain well and was therefore not effective in the hydrogenation. As a result the reaction was slow (half-life about 90 minutes) and the hydrogen uptake was less than the theoretical. The active life of the catalyst was nevertheless very long.

EXAMPLE V

Reduction of tertiaryl butyl hemiacetal of alpha-hydroxypropionaldehyde

When alpha-hydroxypropionaldehyde is reacted with tertiary butyl alcohol to make the hemiacetal, and the hemiacetal in solution in equal parts of tertiary butyl alcohol and water is hydrogenated at about 70° to 80° C. under 500 p.s.i.g. pressure of hydrogen using Raney chromium-nickel alloy catalyst of 1.7% wt. chromium content prepared according to the method of U.S. Patent 2,502,348, a good yield of 1,2-dihydroxypropane is obtained at a long catalyst life as in Example I.

The long effective life of the hydrogenation catalysts in the foregoing examples is in contrast with that obtained when the same hydroxyaldehydes are reacted under analogous conditions without preliminary conversion to the hemiacetal as shown by the following test with alpha-hydroxyadipaldehyde which was hydrogenated in the apparatus used in Example I. A 720 ml. aqueous solution of the aldehyde (107 grams, 0.82 mole) adjusted to pH 7.5 with aqueous sodium hydroxide was hydrogenated at 65° C. and 500–520 p.s.i. hydrogen using about 5 grams of Raney nickel prepared as previously described as the catalyst. The initial rate of reaction was comparable to that obtained with the isopropyl hemiacetal at the same catalyst level ($k_1 = 82 \times 10^{-3}$ min.$^{-1}$, half life 20 min.). The hexanetriol product was discolored and of poor odor even after distillation whereas the product of Example I was much lighter and of good odor. A second hydrogenation over the same catalyst had an apparent rate constant of $26 \times 10^{-3}$ min.$^{-1}$ which is only 31% of the rate of the first batch showing that the catalyst activity declines approximately twice as fast as when the hemiacetal is hydrogenated. This is further illustrated in the following example.

EXAMPLE VI

Reduction of the normal propanol hemiacetal of alpha-hydroxyadipaldehyde

This hydrogenation was carried out with a 33% wt. solution of alpha-hydroxyadipaldehyde in water which was converted to the hemiacetal by addition of an equal volume of normal propanol, forming a solution free from undissolved solids and having a pH of 6.6 and containing 2.6 equivalents of carbonyl per liter. This solution was fed at the rate of 0.924 liter per hour into a reactor containing 1.37 liters of mixture with 10.19 grams of Raney nickel as catalyst. During a seven-hour run 43 grams of hexanetriol was produced per gram of catalyst. The rate of catalyst deactivation in this test was only half that obtained with water alone as the solvent under the same conditions.

EXAMPLE VII

Reduction of glutaraldehyde

A 17% wt. aqueous solution of glutaraldehyde which had been prepared by hydrolyzing freshly distilled ethoxydihydropyran with p-toluenesulfonic acid as catalyst and neutralizing to pH 7 with dilute caustic, was treated with an equal volume of isopropanol to form a 9.4% solution of glutaraldehyde in the form of its isopropyl dihemiacetal. This solution was hydrogenated in a batch reactor at 100° C. using 500 p.s.i. hydrogen pressure and 6.0 grams of Raney nickel per liter of reaction mixture. A 95% yield of colorless 1,5-pentanediol, B.P. 105–106° C. at 1.4 mm. Hg, was obtained. For comparison a 9.4% wt. solution of the same glutaraldehyde in water alone was hydrogenated under the same conditions. The times required for completion of the hydrogenation in successive batches with the same catalyst were as follows:

| Batch | Total Reaction Time, min. | |
|---|---|---|
| | Hydrogenation of the Hemiacetal | Hydrogenation of the Free Dialdehyde |
| First | 19 | 26 |
| Second | 28 | 40 |

The considerably longer time required, especially for the second batch, reflects the more rapid deactivation of the catalyst by the free aldehyde as compared with the hemiacetal.

Instead of glutaraldehyde, glyoxal can be hydrogenated as hemiacetal in the same way with long catalyst life.

It will thus be seen that the new process of the invention offers substantial advantage over prior methods of hydrogenating aldehydes having substituents reactive with the aldehyde group such as other aldehyde groups or hydroxyl groups. This new process is especially useful for the liquid phase hydrogenation of alpha- and/or beta-hydroxyaldehydes. These aldehydes, as a class, have in the past been particularly expensive to hydrogenate because of the high rates at which they deactivate hydrogenation catalysts. The process of the invention is of special advantage in overcoming this difficulty in hydrogenating aliphatic hydroxyaldehydes of two to ten carbon atoms per molecule, where it can be used successfully, regardless of the alcohol—whether mono- or polyhydric—employed in making the hemiacetal which is hydrogenated or of the particular alpha- or beta-hydroxyaldehyde from which the hemiacetal is derived. Hydroxyaldehydes other than those shown in the foregoing illustrative examples which can be similarly converted to hemiacetals and hydrogenated to polyols while obtaining long effective catalyst life are, for instance, glycollic aldehyde which in the form of its ethyl hemiacetal, for example, is hydrogenated to ethylene glycol and ethanol; hydracrylaldehyde whose isopropyl hemiacetal gives trimethylene glycol and isopropanol; alpha-hydroxyisobutyraldehyde whose propyl hemiacetal yields isobutylene glycol and n-propanol; alpha-hydroxyhexanal whose methyl hemiacetal is converted to 1,2-dihydroxyhexane and methanol; alpha-hydroxydecanal from whose secondary butyl hemiacetal one obtains 1,2-dihydroxydecane and secondary butanol; alpha-methyl glyceraldehyde whose ethyl hemiacetal yields beta-methylglycerol and ethanol; alpha,gamma-dihydroxy-butanal whose isopropyl hemiacetal gives 1,2,4-trihydroxybutane and isopropanol; 2,6-dihydroxyhexanal from whose secondary butyl hemiacetal 1,2,6-hexanetriol and secondary butanol are obtained; aldose sugars, such for instance as dextrose from whose isopropyl hemiacetal sorbitol and isopropyl alcohol are obtained; alpha,beta-dihydroxy-beta-phenylpropionaldehyde whose isopropyl hemiacetal gives alpha-phenyl- and/or alpha-cyclohexylglycerol, depending upon the reaction conditions, and isoproponol; hydroxysuccinaldehyde whose ethyl hemiacetal yields 1,2,4-trihydroxybutane and ethanol; alpha,gamma-dihydroxyglutaraldehyde whose methyl hemiacetal gives 1,2,4,5-tetrahydroxypentane and methanol and the like. The invention is especially useful for the reduction of alpha- or beta-monohydroxy aliphatic aldehydes having three to six carbon atoms per molecule and containing only carbon, hydrogen and hydroxy and aldehyde oxygen atoms.

Among the polyaldehydes which can be hydrogenated by the method used in Example VII with glutaraldehyde and glyoxal, are, for instance, malonaldehyde, adipaldehyde, sebacaldehyde, glutaconaldehyde, 1,1,5-pentanetricarboxaldehyde, phthalaldehyde, 2,7-naphthalenedicarboxaldehyde, and the like. As in the case when hydrogenating hemiacetals of other substituted aldehydes, including hydroxyaldehydes, unsaturated starting compounds will usually yield saturated polyols as products, except in the case of those with aromatic rings which can be saturated or not by control of the reaction conditions, especially temperature. Thus from glutaconaldehyde isopropyl dihemiacetal one obtains 1,5-pentanediol, while with the corresponding hemiacetal of phthalaldehyde either 1,2-dimethylol benzene or 1,2-dimethylolcyclohexane can be made the principal product of the hydrogenation. Still other variations can be made in the process which is not limited to the examples which have been given nor by any theory advanced in explanation of the improved results which are obtained.

We claim as our invention:

1. In a process for converting an aqueous solution alpha-hydroxy aliphatic aldehyde of 3 to 6 carbon atoms per molecule composed of carbon, hydrogen, and hydroxy and aldehyde oxygen atoms to the corresponding polyol in which a hydrogenation step is carried out in the presence of a solid hydrogenation catalyst at about 20° to about 300° C. under hydrogen pressure of about 50 to about 5000 p.s.i.g., the improvement, whereby the effective life of the catalyst is extended, of reacting a freshly prepared clear aqueous solution of said alpha-hydroxyaldehyde before formation of undissolved polymer of said aldehyde therein, with an aliphatic, saturated unsubstituted alcohol of 1 to 6 carbon atoms per molecule to produce the hemiacetal of said alpha-hydroxyaldehyde and said alcohol having a solubility in the hydrogenation mixture of at least 0.1 gram per 100 grams of liquid mixture and carrying out the said hydrogenation with the resulting aqueous solution of said hemiacetal.

2. A process in accordance with claim 1 wherein the reaction of the alpha-hydroxyaldehyde solution is carried out with an excess of water-soluble alcohol to obtain an aqueous alcoholic solution of said hemiacetal for said hydrogenation.

3. A process in accordance with claim 2 wherein glyceraldehyde is converted to glycerol.

4. In a process for producing a triol from an aqueous solution of an aliphatic, unsubstituted alpha-hydroxydialdehyde of 3 to 6 carbon atoms per molecule, the improvement of reacting a freshly prepared, clear aqueous solution of said alpha-hydroxydialdehyde before formation of undissolved polymer of said aldehyde therein with an aliphatic, saturated unsubstituted alcohol of 1 to 6 carbon atoms per molecule to produce the hemiacetal of said hydroxydialdehyde and said alcohol having a solubility in the reaction mixture of at least 0.1 gram per 100 grams of liquid mixture and hydrogenating, the resulting aqueous solution of said hemiacetal at about 50° to 200° C. under about 400 to 1000 p.s.i.g. hydrogen pressure in the presence of a Raney nickel catalyst and a pH of about 6 to 7 whereby long, effective catalyst life at high yields of triol are obtained.

5. A process in accordance with claim 4 wherein hexanetriol is produced from alpha-hydroxyadipaldehyde using a water soluble alkanol as the alcohol in making the hemiacetal solution.

6. In a process for producing a polyol from an aqueous solution of an aliphatic, unsubstituted, alpha-hydroxyaldehyde of 3 to 6 carbon atoms per molecule, the improvement of reacting a freshly prepared clear aqueous solution of said alpha-hydroxyaldehyde before formation of undissolved polymer of said aldehyde therein, with an excess of a water-soluble, aliphatic saturated unsubstituted alcohol of 1 to 6 carbon atoms per molecule to produce the hemiacetal of said alpha-hydroxyaldehyde and said alcohol having a solubility in the reaction mixture of at least 0.1 gram per 100 grams of the mixture and hydrogenating the resulting aqueous alcoholic solution of said hemiacetal at about 50° to 200° C. under about 400 to 1000 p.s.i.g. hydrogen pressure in the presence of a Raney nickel catalyst and a pH of about 6 to 7 whereby long, effective catalyst life at high yields of polyol are obtained.

References Cited by the Examiner

UNITED STATES PATENTS 2,888,492   5/59   Fischer et al. _____ 260—635

FOREIGN PATENTS 309,200   3/29   Great Britain
348,248   5/31   Great Britain
356,603   9/31   Great Britain LEON ZITVER, *Primary Examiner.*